United States Patent
Harding et al.

(10) Patent No.: US 11,250,358 B2
(45) Date of Patent: Feb. 15, 2022

(54) ASSET MANAGEMENT EXPERT PEER IDENTIFICATION

(71) Applicant: International Business Machines Corporation, Armonk, NY (US)

(72) Inventors: Kyle Harding, North Attleboro, MA (US); Jonathan Tristan O'Gorman, Cork (IE); Brian Russell Garrett, Apex, NC (US); Sarika Budhiraja, Westford, MA (US); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 16/850,600

(22) Filed: Apr. 16, 2020

(65) Prior Publication Data

US 2021/0326797 A1 Oct. 21, 2021

(51) Int. Cl.
*G06Q 10/00* (2012.01)
*G06Q 10/06* (2012.01)
*G06F 16/28* (2019.01)
*G06F 9/451* (2018.01)
*G06Q 10/10* (2012.01)

(52) U.S. Cl.
CPC ..... *G06Q 10/063112* (2013.01); *G06F 9/451* (2018.02); *G06F 16/285* (2019.01); *G06Q 10/06312* (2013.01); *G06Q 10/06398* (2013.01); *G06Q 10/063114* (2013.01); *G06Q 10/105* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 8,732,654 | B2 * | 5/2014 | Venkataraman | G06F 16/283 717/104 |
| 9,824,135 | B2 * | 11/2017 | Imhof | G06K 9/342 |
| 9,858,331 | B2 * | 1/2018 | Tang | G06F 16/9024 |
| 9,858,333 | B2 * | 1/2018 | Tang | G06F 16/285 |

(Continued)

OTHER PUBLICATIONS

Shao, Chengcheng, Rank correlation between centrality metrics in complex networks: an empirical study, 2018, DE Gruyter Open Physics, https://www.degruyter.com/document/doi/10.1515/phys-2018-0122/html, p. 1-15. (Year: 2018).*

*Primary Examiner* — Joseph M Waesco
(74) *Attorney, Agent, or Firm* — Patterson + Sheridan, LLP

(57) ABSTRACT

A method of expert peer identification includes receiving, from a user, a request for an expert peer for an asset type, and obtaining asset interaction data relevant to the request including a list of assets, and, for each asset on the list, values for each of a set of pre-defined interaction categories for each worker that has interacted with the asset. The method further includes, for each asset on the list, respectively multiplying the interaction category values by a corresponding set of category weights to obtain a set of weighted interaction values, and, for each worker, processing the sum of their weighted interaction values to obtain an overall centrality measure. The method also includes selecting one of the workers as the expert peer based, at least in part, on their overall centrality measure, and identifying the expert peer to the user.

16 Claims, 10 Drawing Sheets

(56) References Cited

U.S. PATENT DOCUMENTS

| | | | |
|---|---|---|---|
| 2008/0271057 A1* | 10/2008 | Bates | G05B 13/02 |
| | | | 719/328 |
| 2009/0012833 A1* | 1/2009 | Kuhlke | G06F 16/335 |
| | | | 705/7.14 |
| 2014/0082072 A1 | 3/2014 | Kass et al. | |
| 2016/0026960 A1 | 1/2016 | Carnahan | |
| 2016/0057180 A1* | 2/2016 | Beckley | G06Q 50/01 |
| | | | 715/753 |
| 2016/0187872 A1* | 6/2016 | Bates | H04L 41/0213 |
| | | | 700/9 |
| 2018/0143975 A1* | 5/2018 | Casal | G06F 40/58 |
| 2018/0159982 A1 | 6/2018 | Konig et al. | |
| 2018/0232367 A1* | 8/2018 | Hausler | H04L 67/02 |
| 2018/0246888 A1* | 8/2018 | Zholudev | H04L 67/02 |
| 2018/0300665 A1 | 10/2018 | Maturana et al. | |
| 2019/0278777 A1* | 9/2019 | Malik | G06F 16/367 |
| 2019/0333078 A1* | 10/2019 | Bala | G06N 20/00 |
| 2019/0354544 A1* | 11/2019 | Hertz | G06N 20/10 |
| 2020/0387818 A1* | 12/2020 | Chan | G06F 17/18 |
| 2021/0158174 A1* | 5/2021 | DeLuca | G06N 20/00 |

\* cited by examiner

| HVAC-1 Worker 310 | Asset Owner 315 | Asset Custodian 320 | Work Log Entry 325 | Labor Transaction 330 | Required Skills 335 | Common Site 340 | Inventory Usage 345 | Expert Peer 350 |
|---|---|---|---|---|---|---|---|---|
| Bill | 0 | 1 | 1 | 1 | 1 | 1 | 1 | 0 |
| Ted | 0 | 0 | 1 | 2 | 1 | 1 | 1 | 0 |
| Frank | 0 | 0 | 0 | 1 | 1 | 1 | 1 | 0 |

| HVAC-2 Worker 310 | Asset Owner 315 | Asset Custodian 320 | Work Log Entry 325 | Labor Transaction 330 | Required Skills 335 | Common Site 340 | Inventory Usage 345 | Expert Peer 350 |
|---|---|---|---|---|---|---|---|---|
| Bill | 0 | 1 | 0 | 0 | 1 | 1 | 0 | 0 |
| Ted | 0 | 0 | 2 | 2 | 1 | 1 | 1 | 0 |
| Frank | 1 | 0 | 4 | 3 | 1 | 1 | 0 | 0 |

FIG. 3

| | |
|---|---|
| 315 Defined asset owner: | 5 |
| 320 Defined asset custodian: | 5 |
| 325 Work log entries: | 2 |
| 330 Labor transactions records: | 3 |
| 335 Skill and qualifications required for an asset: | 1 |
| 340 Common site to the asset in question: | 1 |
| 345 Inventory usage records for work on an asset: | 2.5 |
| 350 Identified expert peer: | 50 |

FIG. 4

HVAC-1

| Worker 310 | Asset Owner 315 | Asset Custodian 320 | Work Log Entry 325 | Labor Transaction 330 | Required Skills 335 | Common Site 340 | Inventory Usage 345 | Expert Peer 350 |
|---|---|---|---|---|---|---|---|---|
| Bill | 0 | 5 | 2 | 3 | 1 | 1 | 2.5 | 0 |
| Ted | 0 | 0 | 2 | 6 | 1 | 1 | 2.5 | 0 |
| Frank | 0 | 0 | 0 | 3 | 1 | 1 | 2.5 | 0 |

HVAC-2

| Worker 310 | Asset Owner 315 | Asset Custodian 320 | Work Log Entry 325 | Labor Transaction 330 | Required Skills 335 | Common Site 340 | Inventory Usage 345 | Expert Peer 350 |
|---|---|---|---|---|---|---|---|---|
| Bill | 0 | 5 | 0 | 0 | 1 | 1 | 0 | 0 |
| Ted | 0 | 0 | 4 | 6 | 1 | 1 | 2.5 | 0 |
| Frank | 5 | 0 | 8 | 9 | 1 | 1 | 10 | 0 |

FIG. 5

| Worker 310 | HVAC-1 610 | HVAC-2 620 |
|---|---|---|
| Bill | 14.5 | 2 |
| Ted | 12.5 | 14.5 |
| Frank | 7.5 | 34 |

FIG. 6

| Worker 310 | Degree(ki) 810 | Tie Strength (si) 820 |
|---|---|---|
| Bill | 2 | 16.5 |
| Ted | 2 | 27 |
| Frank | 2 | 41.5 |

FIG. 8

| Rank 910 | Worker 310 | Degree(ki) 810 | Tie Strength (si) 820 | Alpha (α) Centrality 920 |
|---|---|---|---|---|
| 1 | Frank | 2 | 41.5 | 9.110434 |
| 2 | Ted | 2 | 27 | 7.348469 |
| 3 | Bill | 2 | 16.5 | 5.744563 |

Where Alpha (α) Centrality for a worker = $k_i * (s_i/k_i)^{1/2}$

FIG. 9

ASSET MANAGEMENT EXPERT PEER IDENTIFICATION

BACKGROUND

The present invention relates to enterprise asset management, and more specifically, to identifying expert peers when advice or guidance is needed for maintenance or repair of a given asset of the enterprise.

Retaining and disseminating tribal knowledge is a key challenge for organizations practicing enterprise asset management. It is noted that knowledge as to how to resolve issues and maintain critical assets is typically built up over many years of experience. At the same time, due to shifts in demographics and the digitization of asset management practices, much of this knowledge is either lost to, or unobtainable by, workers in the enterprise. Very often, technicians are sent to resolve issues with critical assets and they are not sure how to successfully complete the task. When trying to find information or assistance about how to do a poorly documented job, technicians often spend time researching on their own to find the best experienced and knowledgeable person in the enterprise to ask advice from. One method of assisting such technicians in need of guidance is a peer-based, visual operation guidance system. Such a system includes an augmented reality overlay that is delivered via a mobile device, where an expert peer annotates live streams of video content to help guide a technician through the various steps of the job. However, such a system assumes the technician already knows whom to ask for the guidance, or somehow the enterprise can readily find such a guide for him or her.

For example, one solution to expert peer identification is for an organization to maintain a database of key experts for each of its assets. However, because organizations often have to manage thousands—or even millions—of assets, documenting a set of experts for each asset is not easily accomplished. Moreover, as a result of employee turnover, such a database can quickly become out of date. Given these facts, both generating and maintaining such a database becomes difficult.

It is useful to provide solutions to address these problems of expert peer identification for enterprise asset management.

SUMMARY

According to one embodiment of the present invention, a method is provided. The method includes receiving, from a user, a request for an expert peer for an asset type, and obtaining asset interaction data relevant to the request including a list of assets, and, for each asset on the list, values for each of a set of pre-defined interaction categories for each worker that has interacted with the asset. The method further includes, for each asset on the list, respectively multiplying the interaction category values by a corresponding set of category weights to obtain a set of weighted interaction values, and, for each worker, processing the sum of their weighted interaction values to obtain an overall centrality measure. The method also includes selecting one of the workers as the expert peer based, at least in part, on their overall centrality measure, and identifying the expert peer to the user.

According to a second embodiment of the present disclosure, a system is provided. The system includes a user interface (UI), configured to receive an expert peer request from a user for an asset type, and a data retriever, coupled to the UI, configured to obtain asset interaction data relevant to the request, the asset interaction data including a list of assets, and, for each asset on the list, values for each of a set of pre-defined interaction categories for each worker that has interacted with the asset. The system further includes an expert peer processor, coupled to the data retriever and to the UI, configured to process the asset interaction data to calculate an overall centrality measure of each worker to the asset type, select one of the workers as the expert peer based, at least in part, on his overall centrality measure, and identify the expert peer to the user.

According to a third embodiment of the present disclosure, a computer-readable storage medium is provided. The computer-readable storage medium has computer-readable program code embodied therewith, the computer-readable program code executable by one or more computer processors to perform an operation. The operation includes to receive, from a user, a request for an expert peer for an asset type, and obtain asset interaction data relevant to the request. The asset interaction data includes a list of assets, and, for each asset on the list, values for each of a set of pre-defined interaction categories for each worker that has interacted with the asset. The operation further includes to, for each asset on the list, respectively multiply the interaction category values by a corresponding set of category weights to obtain a set of weighted interaction values, and for each worker, to process a sum of their weighted interaction values to obtain an overall centrality measure. The operation still further includes to select one of the workers as the expert peer based, at least in part, on their overall centrality measure, and to identify the expert peer to the user.

BRIEF DESCRIPTION OF THE SEVERAL VIEWS OF THE DRAWINGS

FIG. 3 depicts an example set of asset interaction data for each of two example heating ventilation and air conditioning ("HVAC") assets of an enterprise, HVAC-1 and HVAC-2, according to one embodiment disclosed herein.

FIG. 4 depicts an example set of weights respectively corresponding to categories of the asset interaction data depicted in FIG. 3, according to one embodiment disclosed herein.

FIG. 5 depicts the example set of asset interaction data of FIG. 3 as multiplied by the example set of weights depicted in FIG. 4, according to one embodiment disclosed herein.

FIG. 6 depicts a connection strength between each worker, and each asset named in the asset interaction data depicted in FIG. 3, according to one embodiment disclosed herein.

FIG. 8 depicts, for each of the workers Bill, Ted and Frank, a centrality degree, and a centrality tie strength, for each of the two HVAC assets shown in FIG. 7, according to one embodiment disclosed herein.

FIG. 9 is a ranking of the three workers Bill, Ted and Frank by overall alpha centrality measure to the network of assets HVAC-1 and HVAC-2, illustrated in FIG. 7, according to one embodiment disclosed herein.

DETAILED DESCRIPTION

Figure 1:
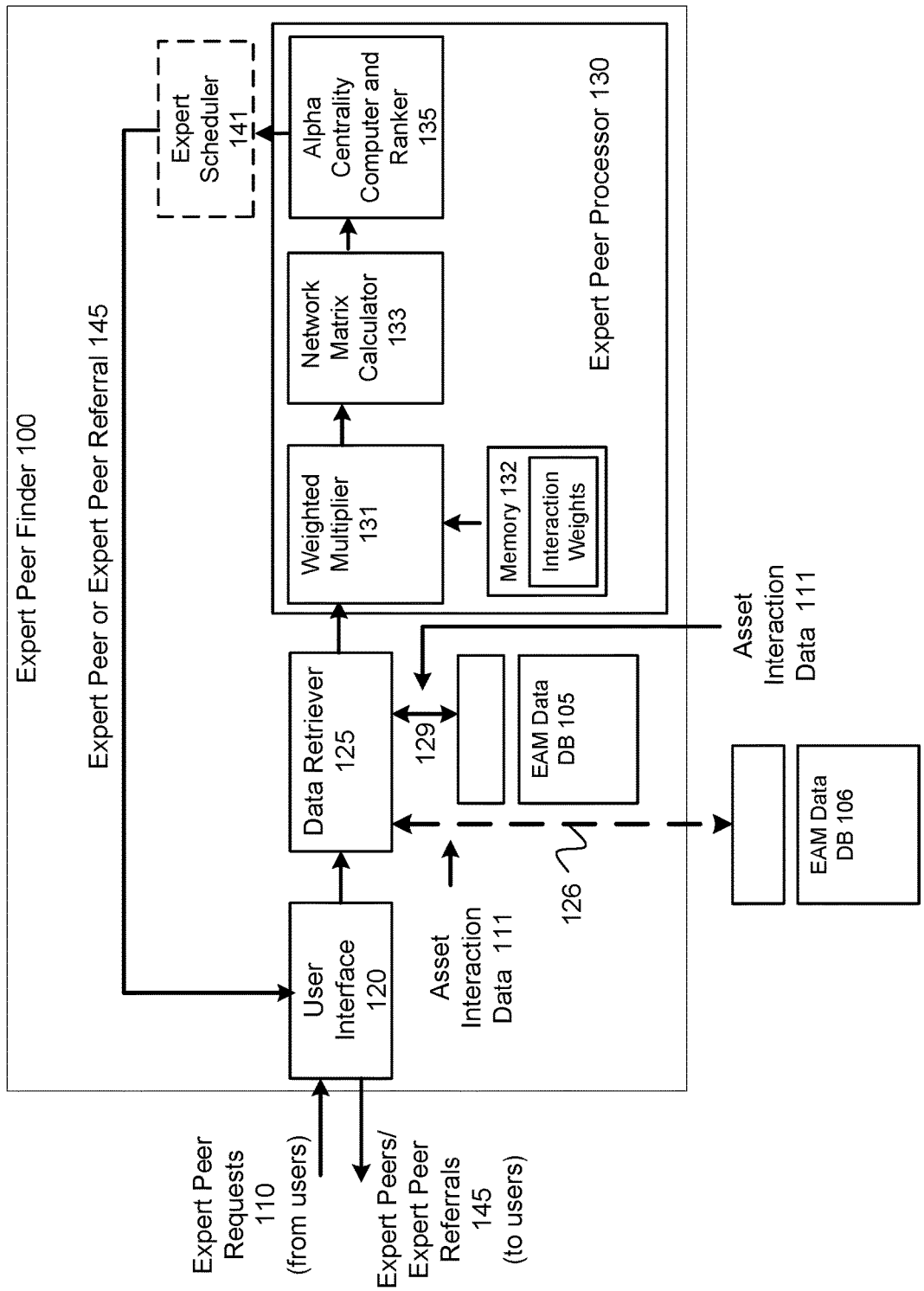
FIG. 1 illustrates a schematic drawing of an example system, according to one embodiment disclosed herein.

Embodiments and examples described herein relate to enterprise asset management, and more particularly to identifying expert peers when a user requests advice or guidance for maintenance or repair of a given asset of the enterprise. In accordance with one or more embodiments, an existing enterprise asset management (EAM) application may be extended to include expert peer identification functionality. In accordance with one or more embodiments, the asset maintenance and repair data that is recorded and managed in the EAM application (or system) may be used to identify one or more expert peers for the asset type of the given asset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In accordance with one or more embodiments, a user request may be received for an expert peer to provide guidance to the user, for example an employee of an enterprise or an employee of a service provider to the enterprise, regarding either maintaining or repairing a given asset of the enterprise. In response to the request, worker interaction data for a set of assets in the same type as the given asset may be obtained, and from that data a worker of the enterprise who has the greatest depth and breadth of experience with the asset type may be identified. For example, the identified worker may have worked with the largest number of such assets, and may have performed significant work on each of them, for example, both in terms of time spent, as well as complexity of repair or maintenance tasks accomplished, as well as having the required skills to perform them.

Thus, for example, a worker of the enterprise may use an EAM application to find the work orders he or she has been assigned, and to enter information pertaining to that work. Within the EAM application, work is tracked against assets. In accordance with one or more embodiments, if the worker encounters a task he or she needs peer guidance for, he or she may also request assistance through the EAM, which may identify an expert peer who can supply the guidance. Thus, given this context, in accordance with one or more embodiments, an expert peer identification application may be designed specifically around the key properties of an EAM system. Such properties may include, for example, asset, location, worker, and work objects. For example, key attributes of asset and location objects may include spare parts, meter data, work order history, associated work and safety plans, and geographic information system (GIS) information. In such EAM systems, for each work object, work descriptions, labor records, inventory and tool usage, work logs, and failure history may be recorded. There may also be labor objects described and stored in the EAM. These may include information about an employee, their skills and qualifications, and their location and contact details.

As described in detail below, in one or more embodiments, data from an EAM may be used to generate an interaction network for a given asset type. Interaction networks are bipartite networks consisting of two types of nodes, people and objects. The people are connected to the objects by edges, where each edge represents an interaction. For an asset type network in an EAM system, the object nodes are the assets that match the asset type of the user query, and the people nodes are the workers who have interacted with these assets. The edges (ties) in the network represent various EAM-specific relationships to the asset, such as, for example, being the specified asset owner or custodian, having work log entries, labor transactions records, skill and qualifications, common location, inventory usage records, and participation in work orders pertaining to the asset.

In in one e embodiments, such an interaction network may be used to calculate an overall centrality measure for each worker in the asset type. These overall centrality scores may then be used to identify one or more expert peers, and, in one or more embodiments, the requesting user may be referred to an expert peer who is then, or will shortly be, available for consult.

FIG. 1 illustrates a schematic drawing of an example system, according to one embodiment disclosed herein. The system of FIG. 1 may be part of, or may interoperate with, an EAM of a given enterprise, for example.

With reference to FIG. 1, there is an expert peer finder 100, configured to receive expert peer requests 110 from users, and to output workers identified as expert peers 145 to the requesting user. In some embodiments, not only is an expert peer identified to the user, but an expert peer who is then available is selected, and a referral to that expert peer 145 provided to the user. Expert peer finder 100 is next described in detail.

Continuing with reference to FIG. 1, a user's expert peer request 110 is received by user interface (UI) 120. The user request 110 includes a peer guidance request for a given asset, such as, for example, a heating, ventilation and air conditioning (HVAC) system that the user is assigned to repair, but, given the problem and the context, needs assistance with. Upon receipt of the user request 110, UI 120 forwards it to data retriever 125. In one or more embodiments, an asset identified in the user's request 110 has its own set of attributes associated to it. One of these attributes may be "Asset Type", and data retriever 125 may use the value of this attribute to obtain asset interaction data 111 for the specified asset type from an EAM database. In one or more embodiments, the asset interaction data 111 includes various worker interactions with all assets that match the type of the asset in the user's request that have been stored in the EAM. For example, in an EAM database 105 or 106. The EAM database may be locally stored, for example, such as EAM data DB 105, in which case data retriever 125 accesses the asset interaction data 111 over local link 129, for example. Alternatively, for example, the asset interaction data 111 may be stored in the cloud, such as, for example, in EAM DB 106, and thus accessed by data retriever 125 over communications link 126, shown in a dashed line in FIG. 1 to indicate that it is over a data communications network. In accordance with one or more embodiments, the asset interaction data includes values for a set of various worker interaction categories. As one example, the set of categories may be those categories as shown in FIG. 3, for two example HVAC assets, described in detail below. In some embodiments, and depending upon the enterprise and how varied its businesses may be, the set of categories may be asset type specific, or specific to some genus of multiple asset types. In other embodiments, the categories may be uniform across all assets of the enterprise.

Continuing with reference to FIG. 1, the asset interaction data 111, once obtained, is sent to expert peer processor 130. Expert peer processor 130 processes the asset interaction data 111 in various ways, and outputs either an expert peer, or an expert peer that is then available for consultation with the user and a referral to that available expert peer 145. The output 145 is sent to UI 120, through which the user may access it. Expert peer processor 130 includes several elements, and these are next described. Weighted multiplier 131 receives the asset interaction data 111 and multiplies the value of each category of the asset interaction data with a corresponding interaction weight, thereby obtaining a set of weighted asset interaction values. The interaction weights are used to emphasize some of the categories over others, and they may vary from asset type to asset type, as may be appropriate. An example set of interaction weights for the interaction categories of FIG. 3 is shown in FIG. 4. The set of weighted asset interaction values is input to network matrix calculator 133, which generates a network matrix for the network comprising the set of assets and the corresponding set of workers obtained from the asset interaction data. In some embodiments, the network matrix is an array that is indexed by workers on one axis and the set of assets responsive to the users best of the other axis. For each worker, there is a total interaction score, which is the sum of all of the weighted interaction values, for each of the assets in the set of assets. An example network matrix is depicted in FIG. 6, described below. The network matrix may also be visualized, using a set of asset nodes and a set of worker nodes, where each worker node's connection to each asset is illustrated by a line with varying thickness. The thicker the line, the greater the tie of that worker to that asset. An example visualization of the network matrix of FIG. 6 is provided in FIG. 7, described below.

Continuing with reference to FIG. 1, the network matrix generated by network matrix calculator 133 is provided to alpha centrality computer and ranker 135. Alpha centrality computer and ranker 135, which is the final element of the expert peer processor 130, processes the network matrix to obtain an overall centrality score of each worker to the network. The higher the overall centrality score, the greater the tie of that worker to the set of assets, and thus to the asset type that they reflect. In accordance with various embodiments, the centrality score is a nonlinear combination of two variables, the degree ($k_i$), which is the number of assets in the network with which that worker has interaction values, and the tie strength ($s_i$), which is the sum of all of the weighted interaction values for that worker, across all assets of the network. As described below, in accordance with various embodiments, the overall centrality score may be:

$$(k_i)*(s_i/k_i)^\alpha,$$

where $\alpha$ is a tuning factor between 0 and 1. In some embodiments $\alpha$ may be ½.

Continuing with reference to FIG. 1, after calculating the overall centrality scores for the workers in the network, alpha centrality computer and ranker 135 then ranks the workers by that score. In some embodiments, the worker with the highest overall centrality score may be chosen as the expert peer, and that worker identified to the user as expert peer 145 through UI 120. In other embodiments, an optional element of expert peer finder 100 may be expert scheduler 141. Expert scheduler 141 finds a potential expert peer who is then available to consult with the user. In one or more embodiments, expert scheduler 141 starts with the worker having the highest overall centrality score and checks his schedule to see if he is available. If not, then expert scheduler 141 proceeds down the list of rankings generated by alpha centrality computer and ranker 135 until it finds an expert peer who is then available. Upon finding an available expert (even if he is not the one with the highest overall centrality score in the network) expert scheduler_141 outputs referral 145 to that expert peer to the requesting user via UI 120.

Figure 2:
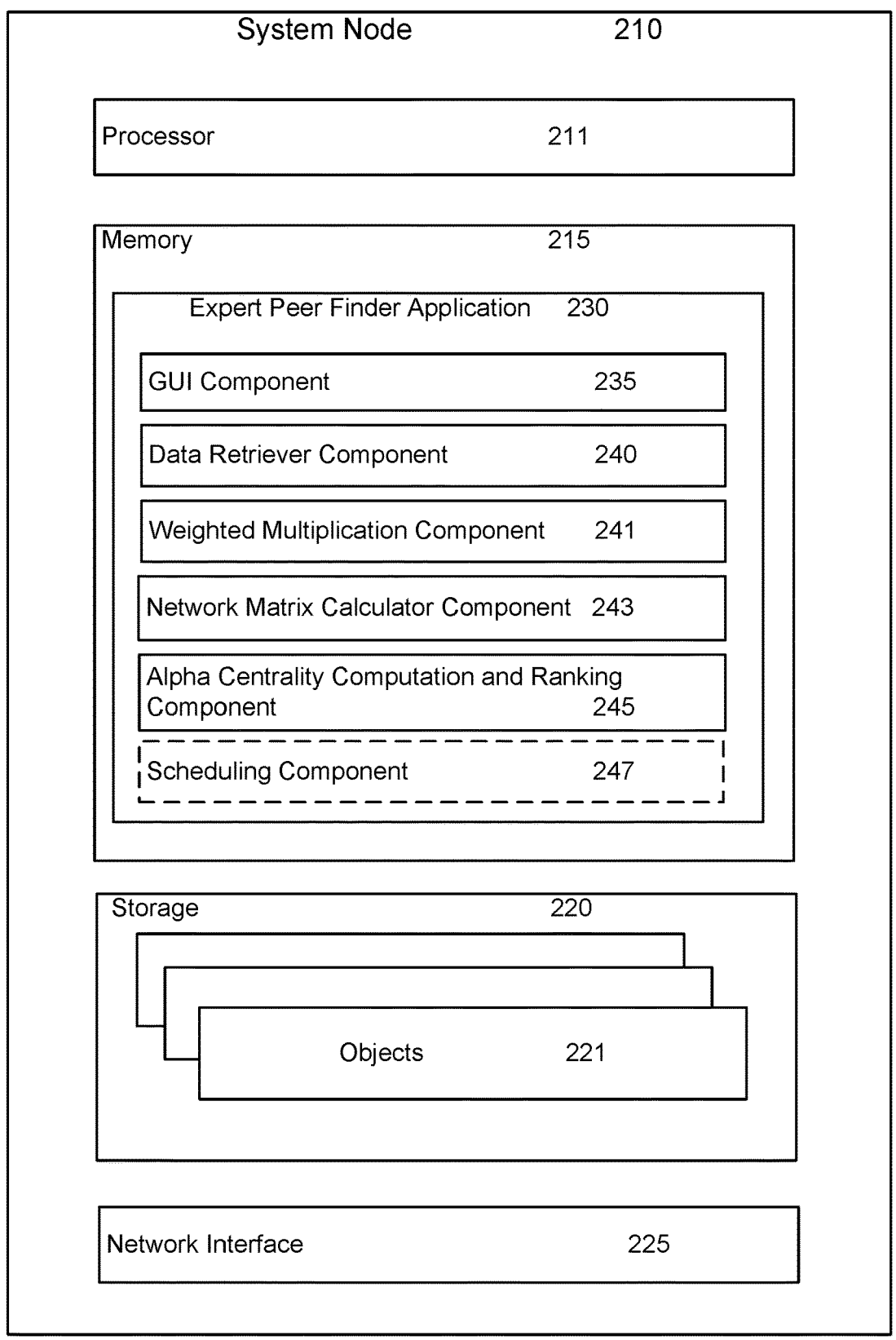
FIG. 2 is a block diagram illustrating a system node configured to provide expert peer guidance finding, according to one embodiment disclosed herein.

FIG. 2 is a block diagram illustrating a system node configured to provide expert peer identification, according to one embodiment disclosed herein. System Node 210 is equivalent to the expert peer finder 100 schematically depicted in FIG. 1, but, for ease of illustration, without showing in FIG. 2 all of the internal (or external) communications pathways that are shown in FIG. 1. As noted above, System Node 210 may be a system node of an EAM, of which the expert peer finder application is one of many applications supported by the System Node 210.

In the illustrated embodiment, system node 210 includes a processor 211, memory 215, storage 220, and a network interface 225. In the illustrated embodiment, the processor 210 retrieves and executes programming instructions stored in memory 215, as well as stores and retrieves application data residing in storage 220. The processor 211 is generally representative of a single CPU, multiple CPUs, a single CPU having multiple processing cores, and the like. The memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more databases, including IASPs. Via the network interface 225, the system Node 210 can be communicatively coupled with one or more other devices and components, such as other System Nodes 210, monitoring nodes, storage nodes, and the like.

In the illustrated embodiment, storage 220 includes a set of objects 221. Although depicted as residing in Storage 220, in embodiments, the objects 221 may reside in any suitable location. In embodiments, the Objects 221 are generally representative of any data (e.g., application data, saved files, databases, and the like) that is maintained and/or operated on by the system node 210. Objects 221 may include asset interaction data, interaction weights, formulae for overall centrality scores, including values for tuning constants, such as, for example, a, all as described above. Objects 221 may also include diagrams of network matrices, and ranked lists of workers by overall centrality score, for each user request that has been previously processed. In one or more embodiments, the prior request information may be used in determining the ranking and relevancy of the expertise for both future requests, and as a reference for historical purposes. Objects 221 may further include one or more algorithms to identify an asset type from an asset named in a user request for peer guidance, to process asset interaction data into a network matrix, to calculate an overall centrality score for each worker in the network, and to generate a ranked list of workers by overall centrality to the network, as described above.

As illustrated, the expert peer finder application 230 includes a GUI component 235, a data retriever component 240, a weighted multiplication component 241, a network matrix calculator component 243, an alpha centrality computation and ranking component 245, and a scheduling component 247. As noted above, scheduling component 247 is optional, and may be provided in some embodiments. Although depicted as discrete components for conceptual clarity, in embodiments, the operations and functionality of GUI component 235, data retriever component 240, weighted multiplication component 241, network matrix calculator component 243, alpha centrality computation and ranking component 245, and scheduling component 247, if implemented in the system node 210, may be combined, wholly or partially, or distributed across any number of components.

In an embodiment, the GUI component 235 is used to receive requests for peer guidance, also referred to herein as "expert peer requests", from users. The users may be workers in asset maintenance and repair, and may need assistance in performing a given task. In an embodiment, in response to the user request, the expert peer finder application retrieves relevant data, and finds one or more expert peers for the user, as described above with reference to FIG. 1. In an embodiment, the GUI is also used to send outputs, in the form of an identification of an expert peer, or a referral to an expert peer who is then available to conference with the user. In some embodiments, the GUI component 235 may also be used to provide to a user, or to a system administrator, a visualization of a network matrix, such as is shown, for example, in FIG. 7, described below.

In embodiments, System Node 210 may receive and send data, such as from or to one or more sources of asset maintenance activity for an enterprise, such as, for example, asset interaction data from an EAM database, such as EAM data DB 106 of FIG. 1, Network Interface 225.

FIGS. 3 through 9, next described, use an example scenario to illustrate various aspects of finding expert peer guidance, in accordance with one or more embodiments. The example scenario is as follows. Sam is a laborer working on a heating ventilation and air conditioning (HVAC) asset of the enterprise. For example, he may be asked to troubleshoot and, if necessary, repair the HVAC asset, due to various reported problems with its operation that have been received from employees of the enterprise who work in a building that depends upon the HVAC asset for heating and cooling. Moreover, there is no specified peer guide for the asset, and Sam, having looked at the system on site, would like the benefit of some expert advice prior to trying to diagnose the problem, and attempt to redress it.

Accordingly, Sam initiates a request for peer guidance for working on an HVAC asset. For example, Sam may make that request via a UI, such as UI 120 of FIG. 1. Upon making the request, an example expert peer finder, such as, for example, expert peer finder 100 of FIG. 1, retrieves data for HVAC assets from an EAM database, such as, for example, EAM database 105 or 106 of FIG. 1. For example, the system may find that there are two instances of this asset type in the system, HVAC-1 and HVAC-2, and may retrieve asset interaction data 111 for each of these two assets.

FIG. 3 depicts an example set of asset interaction data for each of two example HVAC assets of an enterprise, HVAC-1 and HVAC-2, according to one embodiment disclosed herein. With reference thereto, the asset interaction data may be presented as a two-dimensional array, indexed by the workers who have worked on these assets, as well as various interaction categories. The categories are designed to flesh out the depth and breadth of experience that each worker has regarding the asset type, here HVAC systems, and there may be more, or less categories than those shown. Moreover, the categories may vary form asset type to asset type. As noted above, in one or more embodiments, the categories are pre-defined in an EAM system, and used to record maintenance and repair work on the enterprise's assets, and thus represent day to day contemporaneous records of respective interactions between workers and the assets. Accordingly, the interaction data may be automatically queried from an EAM database.

Continuing with reference to FIG. 3, there are eight example interaction categories, labeled with index numbers 315 through 350, as shown. These include whether the worker is listed as the asset owner 315, or as the asset custodian 320, the number of work log entries 325 the worker entered for the asset, the number of labor transactions 330 the worker was involved in with the asset, whether the worker possesses the required skills 335 for the asset, whether the worker is based in the same site or location as the asset 340, inventory usage 345 and whether the worker has already been designated, for example in response to prior queries, as an expert peer 350 for the asset. It is noted that "inventory usage 345" is an interaction type of a worker with an asset where the worker has either checked out or consumed spare parts for the asset from inventory. As shown in FIG. 3, there are three workers who have interacted with the two assets HVAC-1 and HVAC-2. One is designated as "asset owner", another as "asset custodian", but none have been designated as an "expert peer" for this asset type. It is here noted that the example eight categories shown in FIG. 3 are only exemplary, and thus are neither exhaustive nor comprehensive. Thus, in one or more embodiments, other categories may be added, still others may be subtracted. For example, there may be another category called "interactions with the asset named in the query" that may have a significant weight (weighting of categories 315 through 350 is discussed below, with reference to FIG. 4). This category may, for example, more heavily weight a worker's activity with the specific asset that is the subject of the expert peer request 110 shown in FIG. 1, as opposed to just interactions with an asset that is in the "asset type" of the asset that is the subject of the user's query. Thus, for example, a worker with a stronger tie to, for example, the HVAC-1 asset may be determined to be the best expert peer for work on HVAC-1, even if another worker has a higher overall centrality score (as defined below with reference to FIG. 9) for the asset type in general.

Given the asset interaction data as shown in FIG. 3, in one or more embodiments the data may be processed to identify one or more expert peers. A first processing of the asset interaction data is to multiply each category by an interaction weight. The set of weights that each of the eight interaction categories of FIG. 3 is to be multiplied by are used to emphasize some of the categories over others, and they may vary from asset type to asset type, and form system to system, as may be appropriate.

FIG. 4 depicts an example set of weights that respectively correspond to the categories of the asset interaction data depicted in FIG. 3, according to one embodiment disclosed herein. As shown, there are four tiers of interaction weights. The highest tier, is 350, where a worker has been previously identified as an expert peer, which has a weight of 50. A second tier, where a worker is defined as either an owner 315 or a custodian 320 of the asset, has a weight of 5. As shown in FIG. 3, Bill is defined as a custodian for HVAC-1, and Frank as an asset owner of the HVAC-2 asset. A third tier includes labor transactions records 330, with a weight of 3, and inventory usage records for work on an asset 345, with a weight of 2.5. Finally, a bottom tier, each with weight of 1.0, for possessing the required skill and qualifications for maintaining or repairing an asset 335, and having a common site to the asset in question 340.

FIG. 5 depicts the example set of asset interaction data of FIG. 3 after multiplication by the example set of interaction weights depicted in FIG. 4. In accordance with one or more embodiments, these weighted interaction values are then summed, for each asset, for each worker. This yields the network matrix for this asset type, HVAC systems, for this enterprise, shown in FIG. 6. Thus, with reference thereto, there are three columns, worker 310, HVAC-1 610 and HVAC-2, 620. Each row, representing data for one worker, has a value of the sum of all weighted interaction values for each asset.

Thus, in one or more embodiments, in an EAM network multiple types of ties may be represented. As described above, each of the ties may be weighted, inasmuch as certain types of interactions with or on an asset are considered stronger ties to the asset than others. For example, using the categories of FIG. 4, being a defined asset custodian for an asset 320 is a stronger tie, with a weight of 5, than being a worker who has only entered a work log query 325 on a work order for the asset, which has a weight of only two. In general, for example, an EAM network may be represented as follows:

$$eam\_netxork\_AT = (W, A, E),$$

where eam_network_AT is a bipartite network for a specific asset type (e.g., HVAC systems) with workers W={w1, . . . wr}, assets A={a1, . . . , as}, and E being the edges or connections between the respective workers and assets. To compute the centrality of the workers to the network, it is necessary to transform the EAM data to an adjacency matrix. Thus, the biadjacency matrix is the r×s 0-1 matrix B in which bi,j=1 if and only if (li, vj)∈E (edges). As eam_network_AT is a bipartite weighted network then the elements bi,j are taken to the weight of the edges (ui, vj), respectively.

Figure 7:
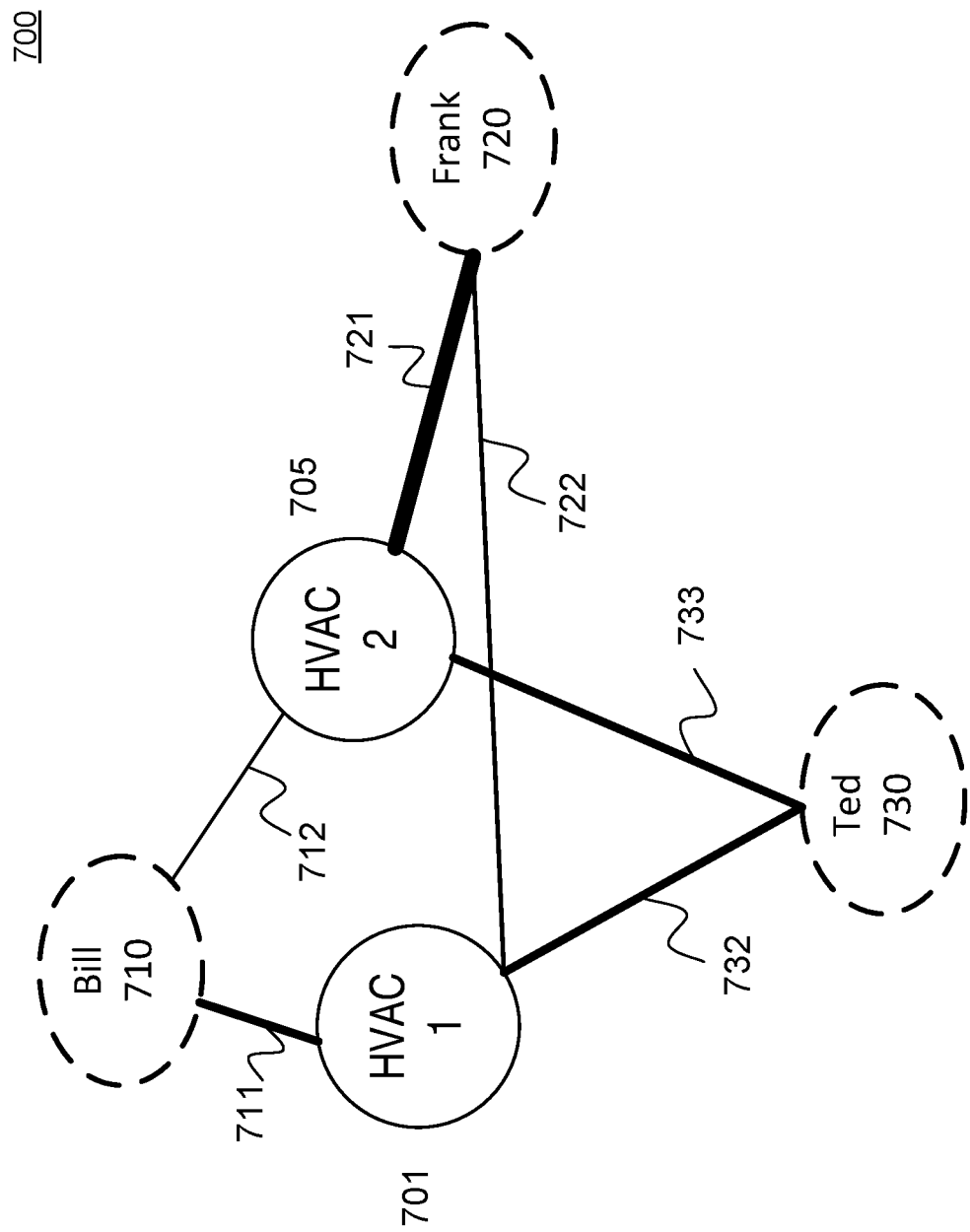
FIG. 7 illustrates an example network of assets and workers generated from, and visualizing, the connection strengths illustrated in FIG. 6, according to one embodiment disclosed herein.

FIG. 6 depicts such a bipartite network, for the data of FIG. 3 as processed in accordance with various embodiments. Moreover, the network matrix of FIG. 6 may also be visualized as shown in FIG. 7, which illustrates bi-partite network 700 comprising two asset nodes, HVAC-1 701 and HVAC-2 705, and three worker nodes, Bill 710, Frank 720 and Ted 730. The worker nodes are shown in dashed outlines, to easily distinguish from the asset nodes, whose outlines are solid lines. Additionally, there is an edge or line between each worker node and each asset node that the worker has a tie to. As shown, each of the three workers Frank, Bill and Ted has some connection to each asset, albeit some connections are much stronger than others. The thickness of the lines connecting worker and asset in FIG. 7 illustrates the strength of the connection between the given worker and the given asset.

Thus, looking at the Bill row in FIG. 6, Bill's connection to HVAC-1 of 14.5 is the strongest of all, but his connection to HVAC-2 of 2.0 is the lowest of all three workers. Accordingly, line 711 to HVAC-1 is relatively strong, but line 712 to HVAC-2 is very thin. Similarly, again with reference to FIG. 6, and in particular the row for Frank, Frank's connection to HVAC-1 of 6.5 is the lowest of all, but his connection to HVAC-2 of 34.0 is the strongest of any worker in the entire network matrix. Accordingly, line 722 to HVAC-1 is on the thin side, and line 721 to HVAC-2 is very thick. Finally, referring once again to FIG. 6, Ted's connection to HVAC-1 of 12.5 is high, and Ted's connection to HVAC-2 of 14.5, while not as high as Frank's 34.0, is also relatively strong. Accordingly, line 732 to HVAC-1 is relatively thick, as is line 733 to HVAC-2.

In one or more embodiments, a tie strength ($s_i$) of a worker to the network as a whole may be computed by adding columns 610 and 620 (which are the per-asset summed weighted interaction values, respectively) of FIG. 6 for each worker. By comparing the tie strength amongst all workers in the network, the overall closeness of a worker to the network at large may be determined. Moreover, because a very high tie to one asset node is not informative as to the worker's tie to the whole network, a degree strength ($k_i$), which is simply a count of how many assets in the network the worker has ties to, may also be computed. In accordance with one or more embodiments, a non-linear combination of $k_i$ and $s_i$ may be used as a measure of centrality of the worker to the network.

FIG. 8 depicts, for each of workers Bill, Ted and Frank, a degree centrality, and a centrality tie strength, for each of the two HVAC assets shown in FIG. 7, according to one embodiment disclosed herein. For an EAM network, an indicator of a worker node is the worker's depth and breadth of experience. For example, the number of assets he has worked with as well as how much work he has done with them. Thus, in accordance with one or more embodiments, a centrality metric is needed that takes into account both number of assets as well as depth of experience with each. In one or more embodiments, the Osphal equation may be used, which incorporates the product of the number of nodes a worker node is connected to with the tie strength, controlled by a tuning parameter, $\alpha$. If the parameter is between 0 and 1, then having a high degree is taken as favorable, whereas if it is set above 1, a low degree is favorable. Thus, for an $\alpha$ between 0 and 1, the more assets in the network the worker has worked with, the better, and conversely, for an $\alpha$ greater than 1 the more interactions the worker has had with an asset, although these multiple interactions were with a fewer overall number of assets, the better. The choice of low degree or high degree relates to whether to favor breadth of experience or depth of experience, respectively.

It is here noted that while in some embodiments the Osphal equation may be used as a centrality metric, as described above, in other embodiments alternate equations or expressions may be used, as may be appropriate given the context of the EAM system involved.

Thus, in accordance with one or more embodiments, to compute the centrality C of a worker node i, the following formula may be used:

$$C_D^{w\alpha}(i) = k_i \times \left(\frac{s_i}{k_i}\right)^\alpha = k_i^{(1-\alpha)} \times s_i^\alpha$$

where α is a positive tuning parameter that can set according to the requirements of the data. In one or more embodiments, α may be set at 0.5, thus building into the centrality measure that a higher degree (number of nodes the worker node is connected to) is more favorable. By calculating the alpha centrality of each worker, the workers may be ranked in order of the alpha centrality, and the worker with the highest centrality chosen as the expert peer in response to the user's request. As an example, the alpha centrality of Bill is computed as follows: alpha centrality (Bill)=2×(16.5/2)0.5=5.744563. The other workers' alpha centrality may be similarly computed. Thus, in one or more embodiments, from an analysis of the EAM network matrix, the most appropriate person to route a peer guidance request to, namely the "expert peer" may be determined.

FIG. 9 presents a ranking of the three workers in the example network, Bill, Ted and Frank, by overall alpha centrality measure to the network of assets HVAC-1 and HVAC-2. As seen in FIG. 9, Frank has the highest alpha centrality value, of 9.110434. As noted above, in some embodiments the name of the expert peer, e.g., Frank, may simply be forwarded to the user, e.g., Sam. In other embodiments, the system may do more than that. In such embodiments, the system may check that the worker with the highest alpha centrality, for example Frank, is then available by checking their calendar in the EAM system. If available, the peer guidance request is then routed to Frank, who is the expert peer that is output to user Sam. However, if Frank is not available, then Sam's request may be routed to the worker with the next highest centrality score, e.g., Ted, if he is available, and so on. If, of course, none are available, then the scheduling attempt fails, and the system may then output the worker with the highest alpha centrality as the expert peer, and the user may contact the expert peer to schedule a conference.

After the expert peer is assigned, and the work order that Sam needed assistance with is completed, a new expert table may be created, and the expert peer, such as, for example. Frank, may be added to it and associated with the asset type, e.g., as an identified expert peer, and thus having a count under "expert peer 350" as shown in FIG. 3, for any asset that matches the asset type Sam has just completed the work order for. Thus, the EAM data for the asset that Sam is working on (or has now finished working on) will be updated, and worker Frank, in this example, will have a count in the EAM asset interaction data for that asset (FIG. 3) as an "expert peer." As a result, future user requests will see in the asset interaction data for the asset a new attribute value for an identified expert peer. Alternatively, in other embodiments, an organization may want to automatically route requests to previously identified experts for that asset or asset type.

Figure 10:
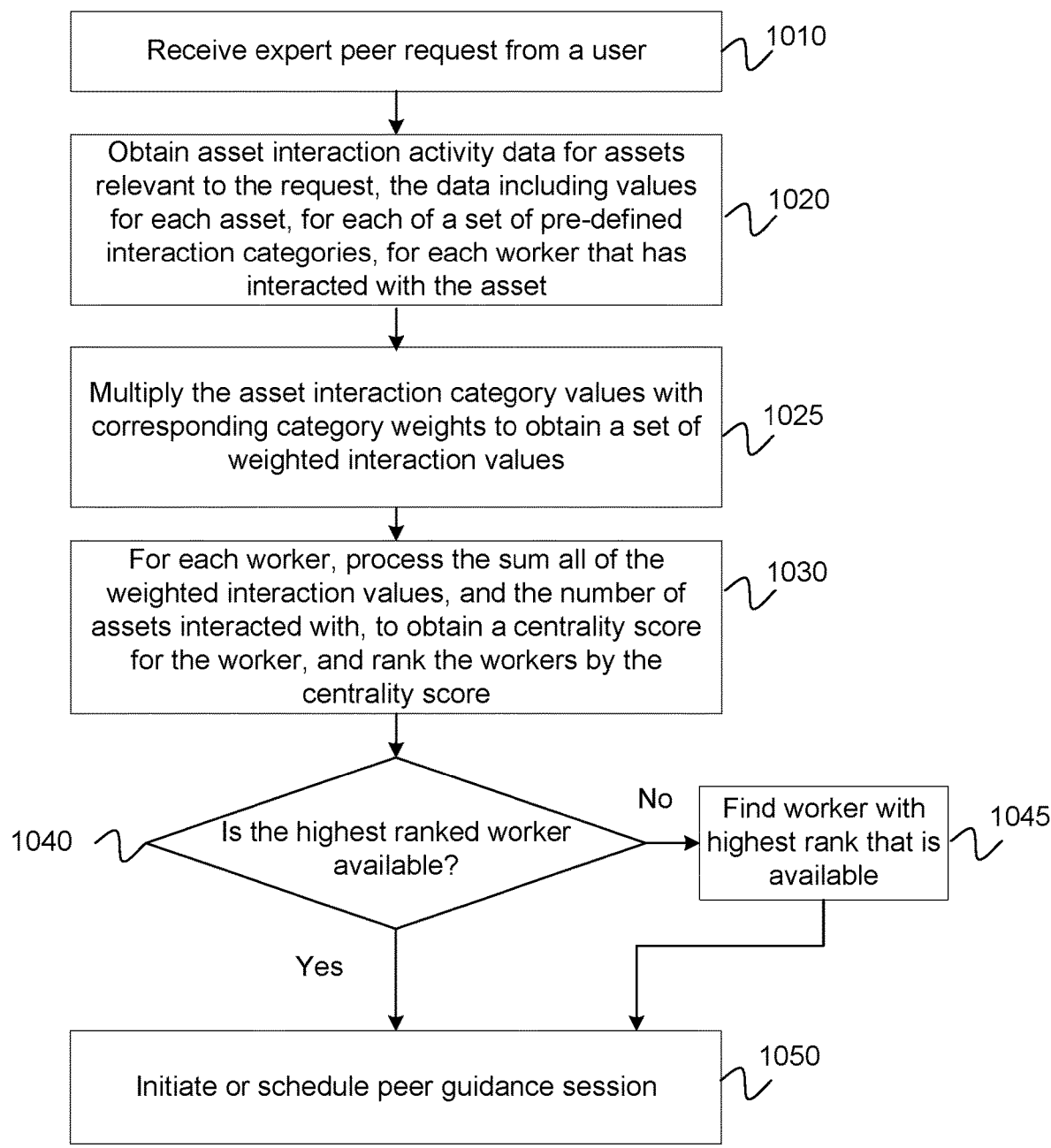
FIG. 10 depicts the process flow of an example expert peer identification method, according to one embodiment disclosed herein.

FIG. 10 depicts the process flow of an example expert peer identification method, 1000 according to one embodiment disclosed herein. Method 1000 includes blocks 1010 through 1050. In alternate embodiments, method 1000 may have more, or fewer, blocks. In one embodiment, method 1000 may be performed, for example, by expert peer finder 100 of FIG. 1, or, for example, by system node 210 of FIG. 2, in particular by expert peer guidance finder application 230.

Continuing with reference to FIG. 10, method 1000 begins at block 1010, where an expert peer request is received from a user. For example, a worker Sam may be assigned a work order for an HVAC asset, and he is unsure as to how to proceed.

From block 1010 method 1000 proceeds to block 1020, where asset interaction activity data is obtained for assets relevant to the request, the data including values, for each asset, for each of a set of pre-defined interaction categories, for each worker that has interacted with the asset. For example, the data illustrated in FIG. 3 may be obtained in response to Sam's request.

From block 1020, method 1000 proceeds to block 1025, where the asset interaction category values are multiplied with corresponding category weights to obtain a set of weighted interaction values, such as, for example, are shown in FIG. 5.

From block 1025, method 1000 proceeds to block 1030, where, for each worker, the sum of all of the weighted interaction values, and the number of assets the worker has interacted with, is processed to obtain a centrality score for the worker, and the workers in the network are then ranked by the centrality score. For example, the data as illustrated in FIG. 9, including the ranking of the workers, may be generated, where the centrality score is the alpha centrality score described above with an alpha value of %.

From block 1030 method 1000 proceeds to query block 1040, where it is determined if the highest ranked worker, now the putative expert peer, is available. For example, an enterprise wide schedule maintained by the EAM may be accessed, and the availability of the highest ranked worker checked. If a "Yes" is returned at query block 1040, and thus the highest ranked worker is available, then method 1000 moves to block 1050, where a peer guidance session is either initiated or scheduled, and method 1000 then ends.

If, however, the return to query block 1040 is a "No", and thus the highest ranked worker by centrality score is not available, then method 1000 proceeds to block 1045, where the worker with the highest centrality value who is available (and this may require checking the schedule of various workers in the network) is found, and method 1000 proceeds to block 1050, where a peer guidance session with the worker found at block 1045 is either initiated or scheduled, and method 100 then terminates.

It is noted that conventionally, assigning an expert to an asset is an arbitrary task. This is because whether a given person is suitable, or not, for the assigned task is difficult to really know. An advantage of systems according to one or more embodiments is that it uses the properties of the asset-worker network itself to determine who actually is the expert, given all known information about the asset and the work performed on it, and by whom, in the past. The system can also understand key properties of the asset-worker network that would not otherwise be trivially discovered. Such an example system would also know the most appropriate resource in real time, as information with which the network matrix is generated would be updated as new work is performed on an asset and workers enter and leave the asset network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access an expert peer finder application in the cloud. For that matter, an entire EAM application may be provided in the cloud, and all personnel of the enterprise may access the EAM application, including the expert peer finder extension application, from any computing system attached to a network connected to the cloud (e.g., the Internet). The expert peer finder application itself may be provided on one server or servers, and the EAM data, such as, for example, as stored in EAM data DB 106, may be provided at another location in a different server or servers. Because a large enterprise may have numerous assets at various locations, a cloud-based expert peer finder application may offer the easiest access to all workers in the enterprise.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, from a user at a user interface, a request for an expert peer for an asset type;
obtaining asset interaction data relevant to the request, the asset interaction data including a list of assets, and, for each asset on the list, values for each of a set of pre-defined interaction categories for each worker that has interacted with the asset;
for each asset on the list, respectively multiplying the interaction category values by a corresponding set of category weights to obtain a set of weighted interaction values;
obtaining an overall centrality measure by processing a network matrix, wherein obtaining the overall centrality measure further comprises:
for each worker, processing a sum of their weighted interaction values; and
calculating a degree centrality ($k_i$), which is a number of the assets on the list the worker has interacted with, and a tie strength centrality ($S_i$), which is a sum of all of the weighted interaction values for the worker, and combining $k_i$ and $S_i$ using a non-linear function,
selecting one of the workers as the expert peer based, at least in part, on their overall centrality measure, and identifying the expert peer to the user; and
outputting a visualization of the network matrix on the user interface, wherein the visualization of the network matrix illustrates connections in the user interface between the assets and the workers and are based on the overall centrality measure, wherein the connections are illustrated by lines with varying thicknesses in the user interface, and wherein a thicker line indicates a greater tie between the worker and the asset.

2. The method of claim 1, wherein the asset interaction data is obtained from an enterprise asset management (EAM) system.

3. The method of claim 2, wherein the EAM system stores work orders assigned to workers, and tracks work done by asset.

4. The method of claim 2, wherein the user is a worker in an enterprise, and submits the request for the expert peer through the EAM system.

5. The method of claim 1, wherein the set of categories includes or is derived from properties of an EAM system.

6. The method of claim 5, wherein the set of categories includes one or more of:
asset owner, asset custodian, work log entries, labor transactions, required skills, common site, inventory usage and expert peer.

7. The method of claim 6, wherein the expert peer category is most heavily weighted, and the asset owner and asset custodian categories are second most heavily weighted.

8. The method of claim 1, wherein the non-linear function is $$k_i^{(1-\alpha)*} s_i^{\alpha},$$

where $\alpha$ is a tuning factor.

9. The method of claim 8, wherein $0<\alpha<1$.

10. A system, comprising:
a user interface (UI), configured to receive an expert peer request from a user for an asset type and output a visualization of a network matrix, wherein the visualization of the network matrix illustrates connections in the user interface between the assets and the workers and are based on the overall centrality measure, wherein the connections are illustrated by lines with varying thicknesses in the user interface, and wherein a thicker line indicates a greater tie between the worker and the asset;
a data retriever, coupled to the UI, configured to obtain asset interaction data relevant to the request, the asset interaction data including a list of assets, and, for each asset on the list, values for each of a set of pre-defined interaction categories for each worker that has interacted with the asset;
an expert peer processor, coupled to the data retriever and to the UI, configured to:
process the asset interaction data to calculate an overall centrality measure of each worker to the asset type;
select one of the workers as the expert peer based, at least in part, on his overall centrality measure; and
identify the expert peer to the user, and wherein the expert peer processor further comprises:
a weighted multiplier, coupled to the data retriever and to a memory, configured to, for each asset, and for each worker of the asset, respectively multiply the values for the interaction categories by a set of corresponding category weights to generate a set of weighted interaction values;
a memory, configured to store one or more sets of corresponding category weights;
a network matrix calculator, coupled to the weighted multiplier, configured to generate the network matrix of workers and assets from the sets of weighted interaction values for each asset; and
a centrality computer, coupled to the network matrix calculator, to generate, from the network matrix, the overall centrality measure for each worker.

11. The system of claim 10, further comprising a scheduler, coupled to the peer expert processor and to the UI, configured to:
   determine availability of the identified expert peer; and
   in response to a determination that the expert peer is available, route the expert peer request to the identified expert peer.

12. The system of claim 11, further comprising:
   in response to a determination that the identified expert peer is unavailable:
      select, as a substitute expert peer, a worker with the highest overall centrality measure who is available; and
      route the expert peer request to the substitute expert peer.

13. A computer program product for fusion of vector data and raster data for a geographic location, the computer program product comprising:
   a computer-readable storage medium having computer-readable program code embodied therewith, the computer-readable program code executable by one or more computer processors to:
   receive, from a user at a user interface, a request for an expert peer for an asset type;
   obtain asset interaction data relevant to the request, the asset interaction data including a list of assets, and, for each asset on the list, values for each of a set of pre-defined interaction categories for each worker that has interacted with the asset;
   for each asset on the list, respectively multiply the interaction category values by a corresponding set of category weights to obtain a set of weighted interaction values;
   obtain an overall centrality measure for a worker the computer-readable program code is further executable to:
      for each worker, process a sum of their weighted interaction values; and
      calculate a degree centrality ($k_i$), which is a number of the assets on the list the worker has interacted with;
      calculate a tie strength centrality ($s_i$), which is a sum of all of the weighted interaction values for the worker; and
      combine $k_i$ and $s_i$ using a non-linear function,
   select one of the workers as the expert peer based, at least in part, on their overall centrality measure, and identify the expert peer to the user; and
   output a visualization of the network matrix on the user interface, wherein the visualization of the network matrix illustrates connections in the user interface between the assets and the workers and are based on the overall centrality measure, wherein the connections are illustrated by lines with varying thicknesses in the user interface, and wherein a thicker line indicates a greater tie between the worker and the asset.

14. The computer program product of claim 13, wherein the set of categories includes, or is derived from, properties of an EAM system.

15. The computer program product of claim 13, wherein the non-linear function is $$k_i^{(1-\alpha)} * s_i^{\alpha},$$

where $\alpha$ is a tuning factor.

16. The computer program product of claim 15, wherein at least one of:
   $\alpha$ has a value between 0 and 1, or
   $\alpha = 0.5$.

* * * * *